US00RE46492E

(19) United States
(12) Reissued Patent
Safford

(10) Patent Number: US RE46,492 E
(45) Date of Reissued Patent: Aug. 1, 2017

(54) GLOVE WITH INDEX FINGER GRIP

(71) Applicant: Mechanix Wear, Inc., Valencia, CA (US)

(72) Inventor: Kenny Safford, Simi Valley, CA (US)

(73) Assignee: Mechanix Wear, Inc., Valencia, CA (US)

(21) Appl. No.: 29/532,005

(22) Filed: Jun. 30, 2015

Related U.S. Patent Documents

Reissue of:
(64) Patent No.: Des. 667,171
Issued: Sep. 11, 2012
Appl. No.: 29/393,751
Filed: Jun. 8, 2011

U.S. Applications:
(62) Division of application No. 29/502,024, filed on Sep. 10, 2014, which is an application for the reissue of Pat. No. Des. 667,171.

(51) LOC (10) Cl. ..... 02-06
(52) U.S. Cl.
USPC ..... D29/117.1
(58) Field of Classification Search
USPC ..... D2/616, 617, 619, 620, 612, 623; D29/117.1, 117.2, 123; D21/400, 807
(Continued)

(56) References Cited

U.S. PATENT DOCUMENTS 2,025,357 A * 12/1935 Pagan ..... 2/16
3,597,765 A * 8/1971 Stanton ..... 2/161.3
(Continued)

FOREIGN PATENT DOCUMENTS

KR 300416270.0000 * 6/2006

OTHER PUBLICATIONS

Mechanix Wear "M-Pact Glove," as shown on-line at http://www.mechanix.com/m-pact-glove. Downloaded from the Internet on Jul. 15, 2012. (5 pages).

*Primary Examiner* — Phillip S Hyder
(74) *Attorney, Agent, or Firm* — Knobbe, Martens, Olson & Bear, LLP

(57) CLAIM

The ornamental design for a "glove with index finger grip [and impact guard]," as shown and described.

DESCRIPTION

[FIG. 1 is a perspective view of a glove with index finger grip and impact guard, showing my new design.]
[FIG. 2 is a front elevational view thereof;]
[FIG. 3 is a rear elevational view thereof;]
[FIG. 4 is a left side elevational view thereof]
[FIG. 5 is a right side elevational view thereof;]
[FIG. 6 is a top plan view thereof; and,]
[FIG. 7 is a bottom plan view thereof.]
*FIG. 8 is a perspective view of a glove with index finger grip showing my new design;*
*FIG. 9 is a front elevational view thereof;*
*FIG. 10 is a rear elevational view thereof;*
*FIG. 11 is a left side elevational view thereof;*
*FIG. 12 is a right side elevational view thereof;*
*FIG. 13 is a top plan view thereof; and,*
*FIG. 14 is a bottom plan view thereof.*
The broken lines shown in the drawings on the design illustrate features of the article to which the design is applied that form no part of the claim. The broken-line oval shown in FIG. [7] *14* that defines the bounds of the claimed design forms no part thereof.

1 Claim, 10 Drawing Sheets

Figure 1:
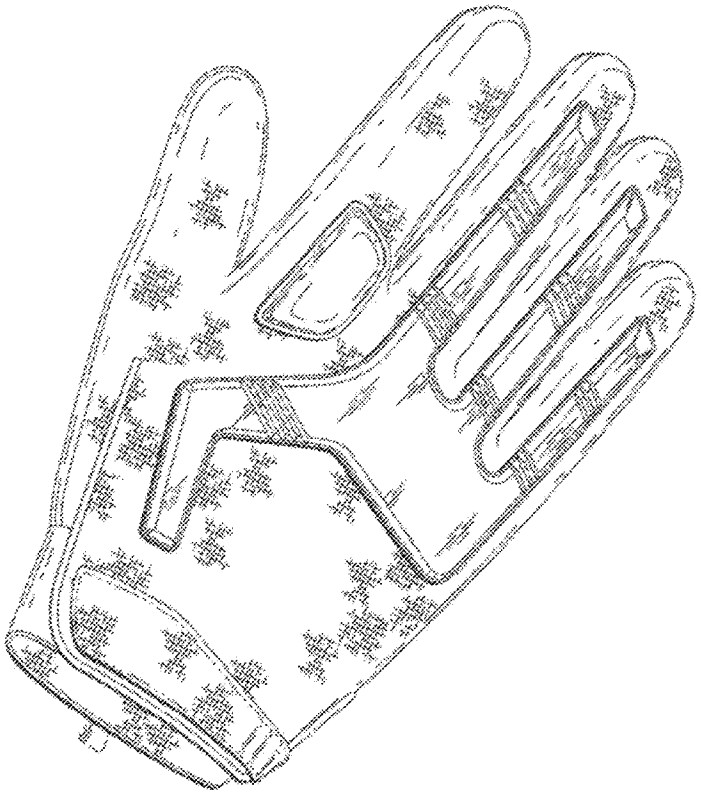
Figure 2:
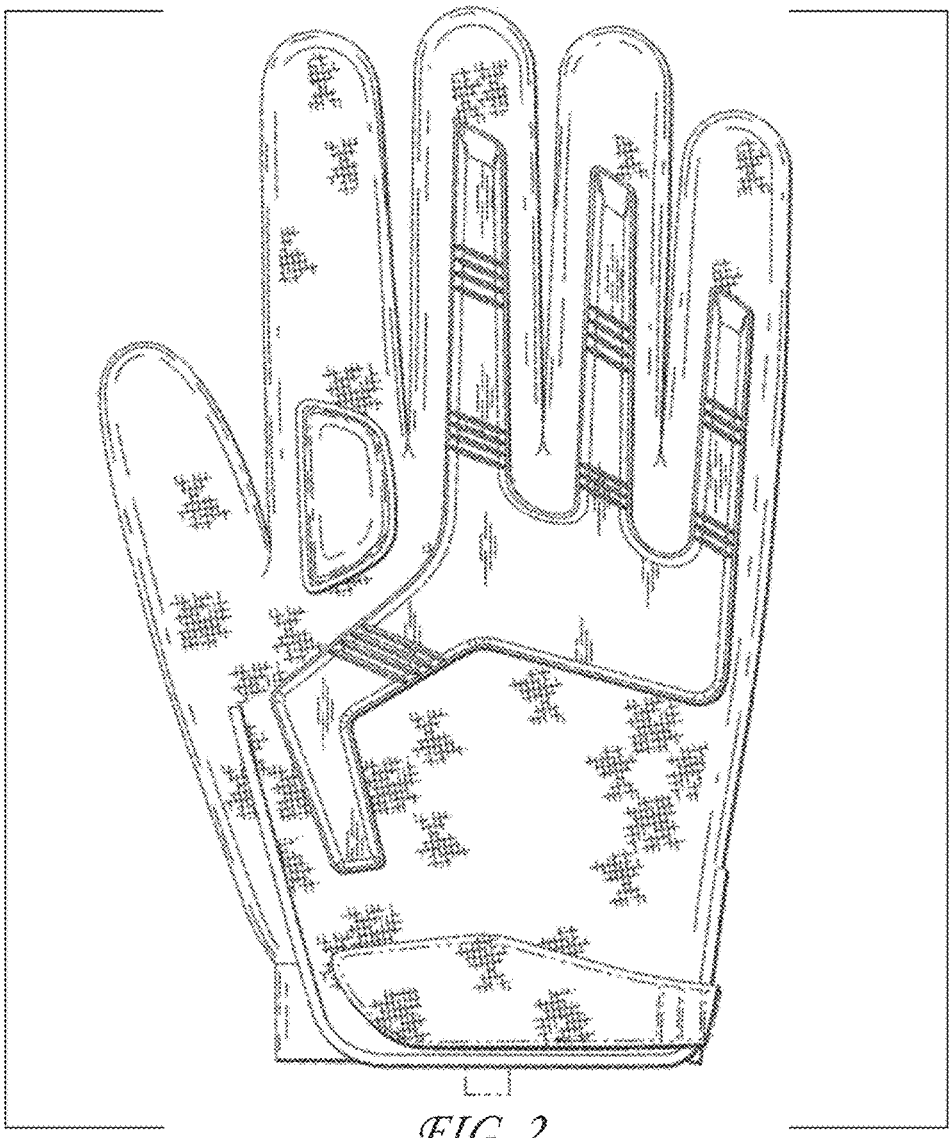
Figure 3:
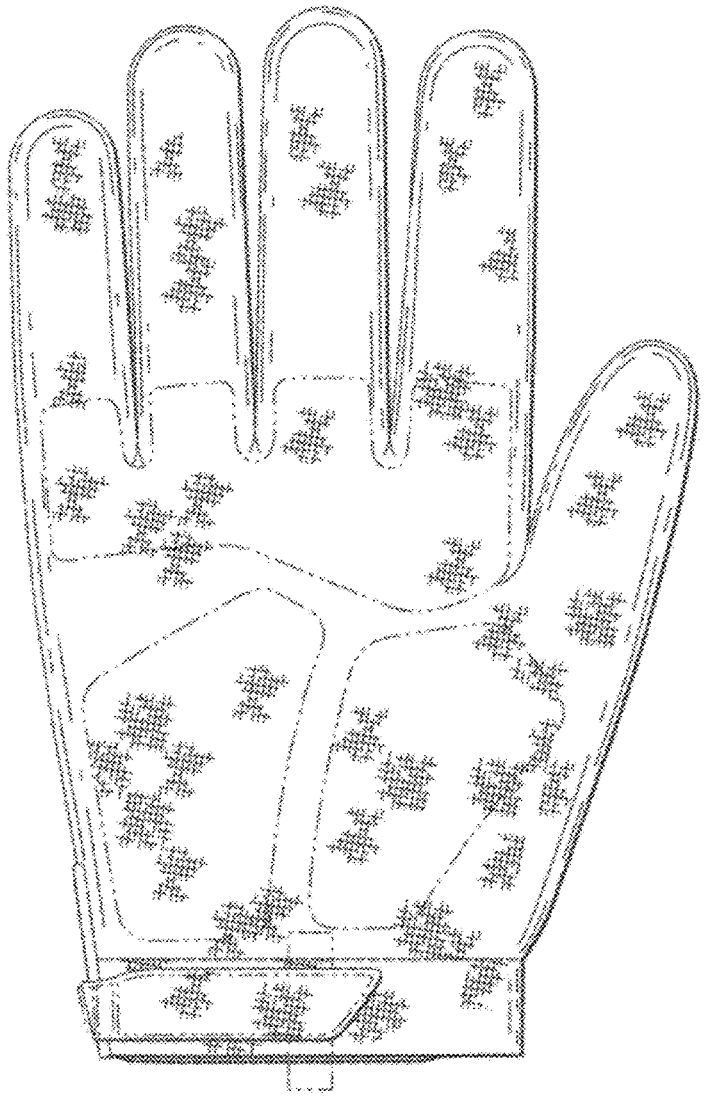
Figure 4:
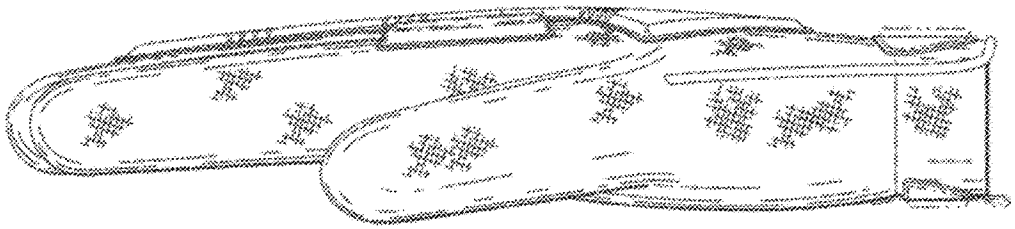
Figure 5:
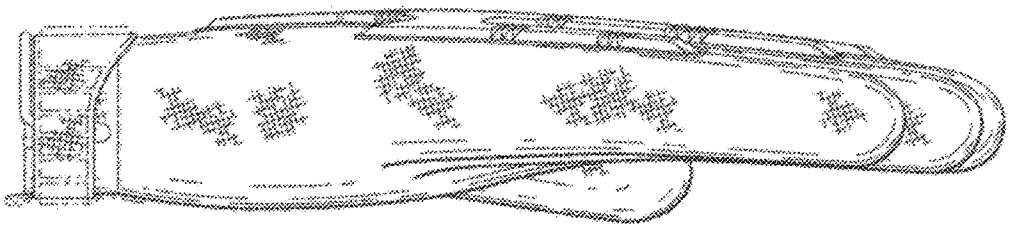
Figure 6:
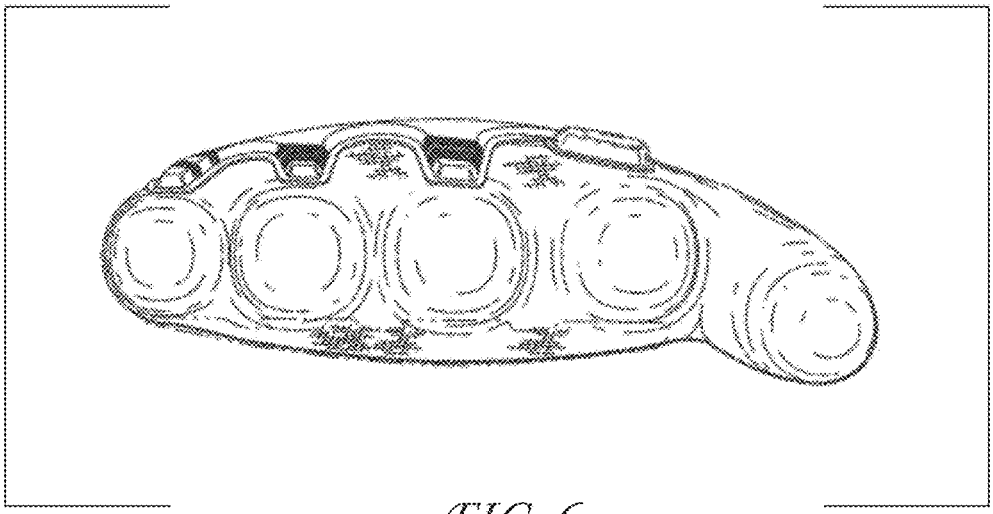
Figure 7:
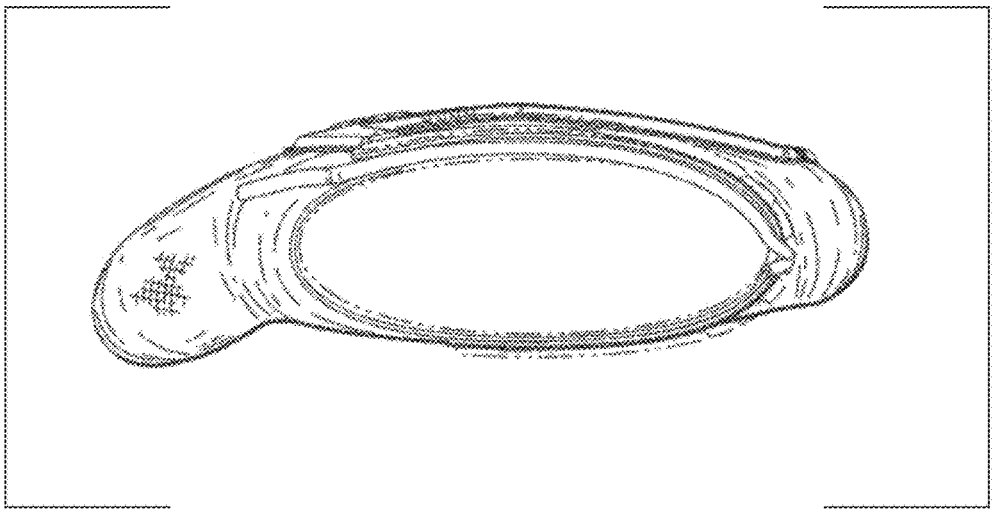

Matter enclosed in heavy brackets [ ] appears in the original patent but forms no part of this reissue; matter printed in italics indicates the additions made by reissue.

*New*

(58) Field of Classification Search
CPC ..... A41D 19/015; A41D 19/1515; A41D 19/1547; A41D 19/1523
See application file for complete search history.

(56) References Cited

U.S. PATENT DOCUMENTS

| | | | | | |
|---|---|---|---|---|---|
| 3,882,548 | A | | 5/1975 | Shinagawa | |
| 3,918,096 | A | * | 11/1975 | Lim | 2/161.1 |
| 4,094,014 | A | * | 6/1978 | Schroeder | A41D 19/01505 2/161.8 |
| D268,968 | S | * | 5/1983 | Sami | D29/117.1 |
| 4,768,234 | A | * | 9/1988 | Yamamoto | A41D 19/01523 2/16 |
| 4,864,660 | A | * | 9/1989 | Sawyer | 2/20 |
| 5,067,175 | A | * | 11/1991 | Gold | 2/16 |
| D328,369 | S | * | 7/1992 | Hong | D29/117.1 |
| D461,620 | S | * | 8/2002 | Bevier | D2/623 |
| 6,732,377 | B1 | * | 5/2004 | Wilkinson | 2/161.4 |
| D490,966 | S | * | 6/2004 | Sasaki | D2/623 |
| D516,277 | S | * | 3/2006 | Mattesky | D2/619 |
| D589,678 | S | * | 4/2009 | Lawrence | D2/617 |
| D604,027 | S | * | 11/2009 | Kleinert | D2/617 |
| D608,978 | S | * | 2/2010 | Votel | D2/617 |
| D621,553 | S | * | 8/2010 | Fitzgerald et al. | D29/113 |
| D625,051 | S | * | 10/2010 | Fitzgerald et al. | D29/113 |
| D648,490 | S | * | 11/2011 | Choi | D29/117.2 |
| D650,532 | S | * | 12/2011 | Choi | D2/619 |
| D653,427 | S | * | 2/2012 | Wong | D2/619 |
| D667,593 | S | * | 9/2012 | Carlson | D2/623 |
| 2008/0263747 | A1 | * | 10/2008 | DeBlasis | A41F 1/06 2/161.1 |
| 2010/0192279 | A1 | * | 8/2010 | Hunsicker | 2/161.2 |

* cited by examiner

Canceled

Canceled

Canceled

Canceled

Canceled

Canceled

Canceled

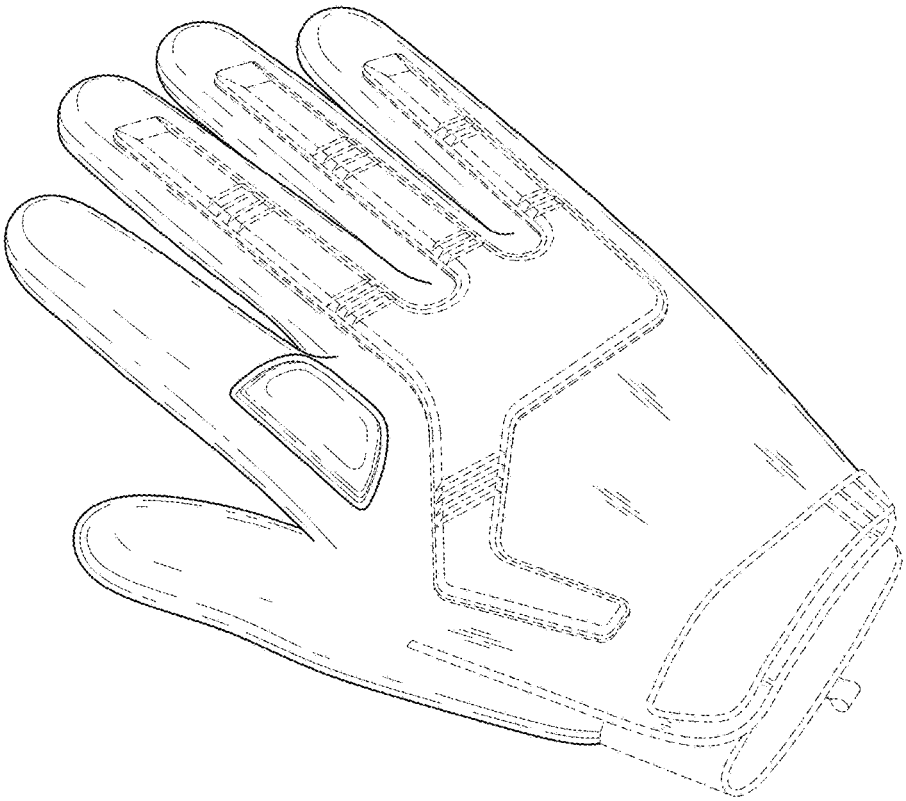
FIG. 8
New

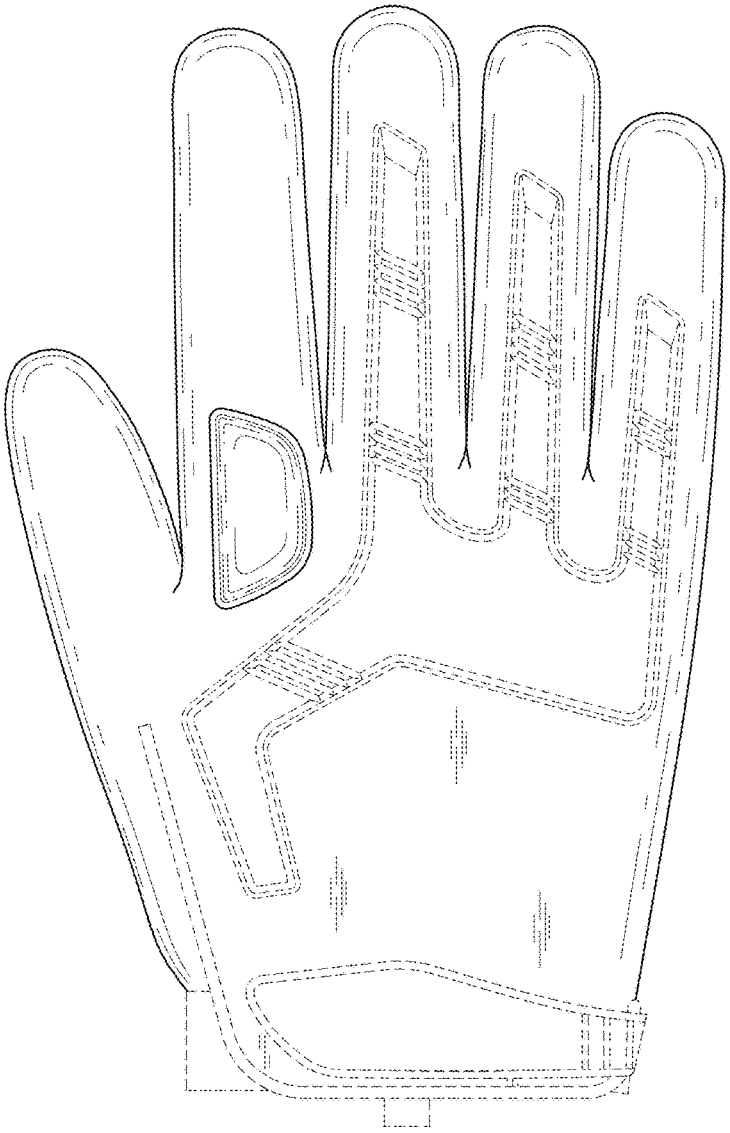
FIG. 9
New

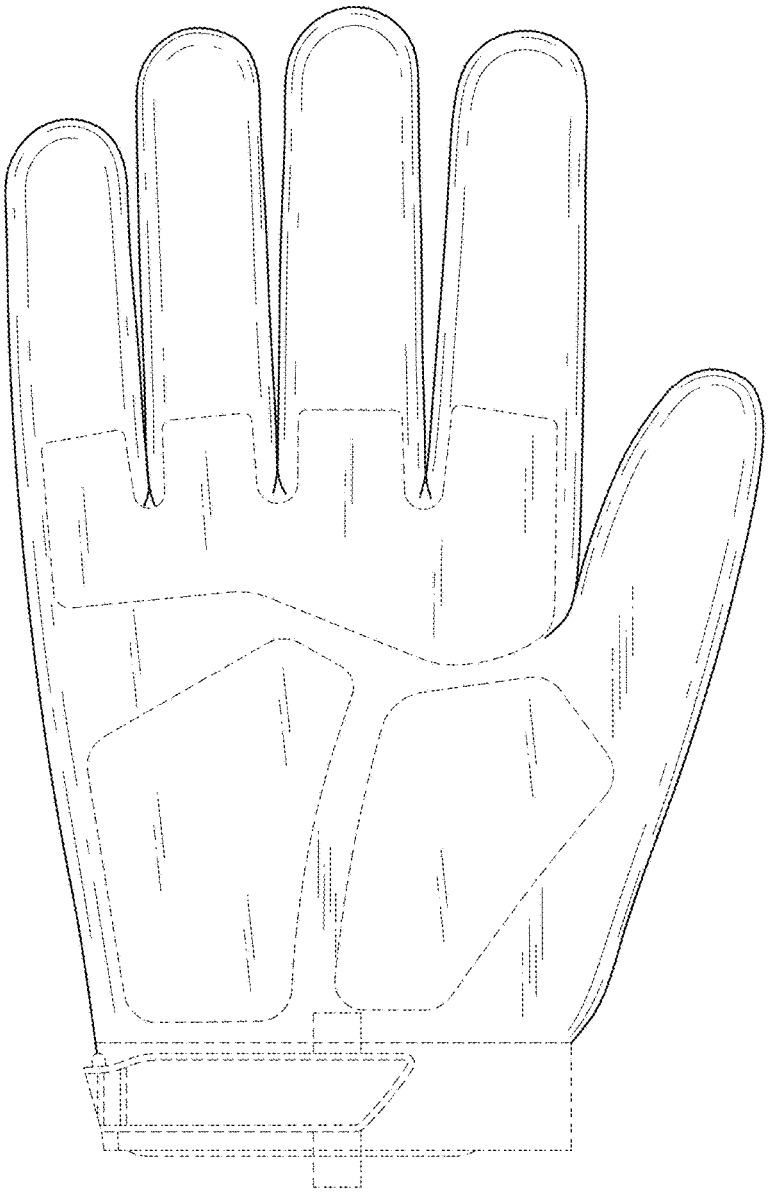
FIG. 10
New

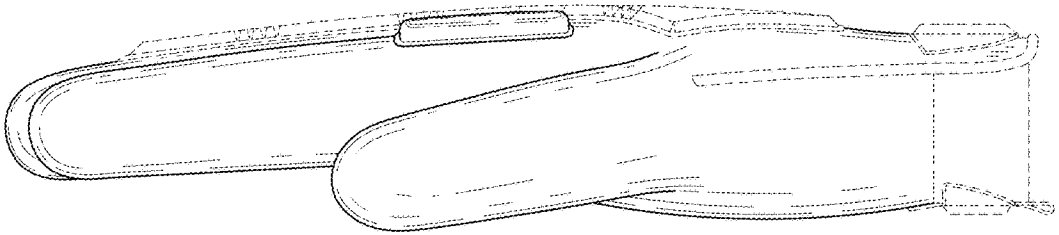
FIG. 11
New
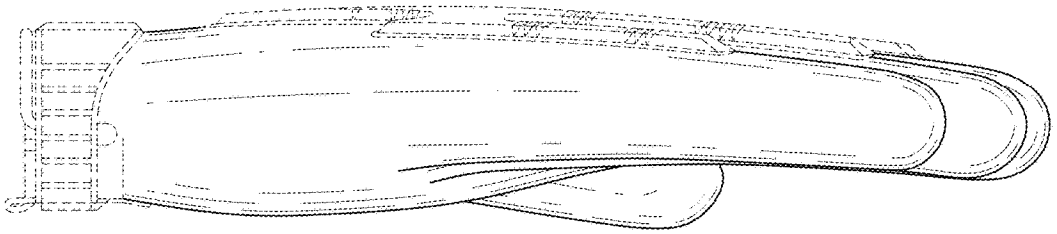
FIG. 12
New

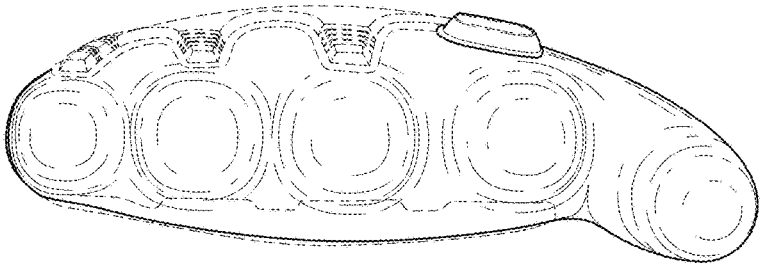
FIG. 13
New
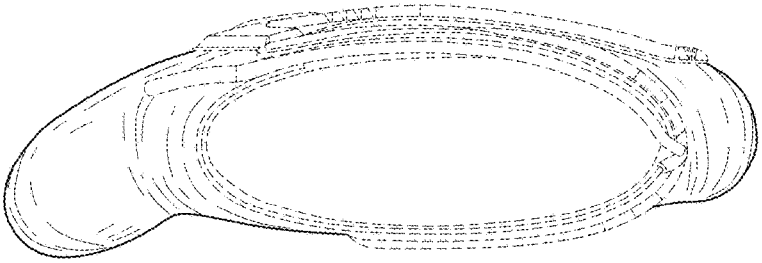
FIG. 14
New